2,744,918

SUBSTITUTED PHTHALIDES AND METHODS OF PREPARING THE SAME

Samuel Kushner, Nanuet, N. Y., and John Morton II, Allendale, N. J., assignors to American Cyanamid Company, New York, N. Y., a corporation of Maine No Drawing. Application May 3, 1952,
Serial No. 286,031

10 Claims. (Cl. 260—343.3)

The invention relates to certain new substituted phthalides and methods of preparing the same. The new compounds of this invention can be represented by the following general formula:

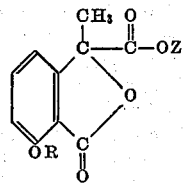

in which R represents hydrogen or a lower alkyl radical, for instance methyl, ethyl, or propyl; and Z represents a cation or an esterifying radical. In other words, it is intended that this invention cover 3-methyl-3-carboxy-7-hydroxyphthalide, the 3-methyl-3-carboxy-7-alkoxyphthalides and their patentable equivalents such as salts and simple esters. The 3-methyl-3-carboxy-7-alkoxyphthalides and 3-methyl-3-carboxy-7-hydroxyphthalide are, of course, carboxylic acids and typical of all carboxylic acids, they form salts with bases. For instance the new compounds of this invention can be isolated in the form of metallic salts, for instance as sodium salts, calcium salts, silver salts, or salts of other salt-forming metals; or the new compounds can be isolated in the form of salts of organic bases, for instance as the piperidine salt. Since the 3-methyl-3-carboxy-7-alkoxyphthalides and 3-methyl-3-carboxy-7-hydroxyphthalide are carboxylic acids, they can also be isolated in the form of their esters with simple alcohols, for instance as methyl esters, propyl esters and benzyl esters.

The new compounds of this invention are crystalline solids useful in many fields of organic chemistry. For instance, the new compounds are useful as intermediates in organic syntheses and may be employed as intermediates for the preparation of compounds having fungicidal activity as disclosed in copending U. S. application S. N. 286,034 filed concurrently herewith. Thus, for example, the compounds of the present invention may be halogenated by an appropriate halogenating agent to produce the 3-methyl-4-halophthalide compounds as disclosed in the aforesaid copending application.

While it is not intended that this invention be limited to compounds of the above class when they are prepared by any one particular procedure, a convenient method of preparing these new compounds has been discovered and it is intended that this new method also constitute a part of the present invention. This new method comprises hydrolyzing a 2-cyano-acetophenonecyanohydrin in the presence of a hydrolyzing agent as may be illustrated by the following equation:

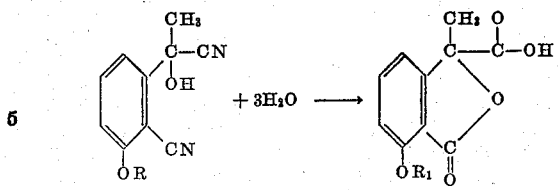

in which R and $R_1$ represent members selected from the group consisting of hydrogen and lower alkyl radicals. Ordinarily, of course, R and $R_1$ will be the same; however, when R represents a lower alkyl group it is possible for $R_1$ to represent hydrogen. This is so since if a very strong hydrolyzing agent, for instance 48% hydrobromic acid, is employed as a catalyst, it is possible not only to hydrolyze the cyano groups, but to also hydrolyze the alkoxy group.

As will be noted from the above equation, water is a necessary reactant in the new process and since water is necessarily present it is usually advantageous to employ an excess of the same as a solvent or diluent. This procedure not only results in added convenience but also usually results in an increased yield of reaction product. Of course various water-miscible inert organic solvents, for instance dioxane and dimethyl formamide, can also be employed and, in fact, their use is frequently advantageous since it results in an increased solubility of the cyanohydrin reactant. It is also sometimes advantageous to employ a water-immiscible solvent, for instance benzene or toluene, in which case the reaction product can be isolated from the reaction mixture as an organic solution by decantation. An interesting and useful variation comprises employing a minimum of water along with an alcohol solvent since by such a procedure one can prepare almost any desired ester of the new phthalide compounds of this invention. If the free acid is then desired, it can be obtained from said ester by hydrolysis.

Suitable hydrolyzing agents which can be employed as catalysts in the new process of this invention are the mineral acids, for instance hydrochloric acid, hydrobromic acid, sulfuric acid, and phosphoric acid. Hydrochloric acid is preferred. The mineral acid hydrolyzing agents are effective in catalytic amounts although an excess is usually advantageous. The acid concentration may be varied within relatively wide limits with satisfactory results, although as will be obvious to those skilled in the art, one should not employ such high concentrations of the strong acids, such as sulfuric, as to endanger the destruction of the organic reactant or the reaction product. As a general rule acid concentrations of from about 6 to 12 normal are the most satisfactory, although the optimum acid concentration in each instance depends upon the particular mineral acid employed.

It is also an advantage of the new process of this invention that the hydrolysis reaction can be performed within a relatively wide range of temperatures. For instance, depending upon the particular mineral acid employed as a hydrolyzing agent, temperatures of from about 40° C. to 125° C. can usually be employed with satisfactory results with temperatures in the range of about 90° C. to 120° C. being preferred. When employing 6 to 12 normal hydrochloric acid, temperatures throughout the entire range of 40° C. to 125° C. are operable; however with other mineral acid hydrolyzing agents, the operable range is usually somewhat narrower. For instance when the phthalide reactant has an alkoxy substituent and it is not desirable to hydrolyze this substituent along with the cyano groups, one should maintain the temperature below about 60° C. when employing 48% hydrobromic acid as a catalyst. On the other hand if it is desirable to hydrolyze the alkoxy group, the reaction temperature when employing 48% hydrobromic as a catalyst, should be maintained above about 80° C. as otherwise the hydrolysis of the alkoxy group will be extremely slow. While some discretion must be exercised, it is believed that one skilled in the art of acid hydrolysis will have little difficulty in choosing a suitable reaction temperature in each instance.

As is typical of acid hydrolysis reactions, the new reaction of this invention proceeds relatively slow and if a reasonably complete reaction is desired, a minimum of from about two to six hours should be allowed for reaction. With the preferred acid catalyst, that is 6 to 12 normal hydrochloric acid, it has been found that the optimum time of reaction at 120° C. is about three to six hours, and at a raction temperature of about 40° C. the optimum reaction time is about twenty-four hours. Of course the optimum reaction time will vary somewhat with other acid hydrolyzing agents but it is believed that those skilled in the art will have little difficulty.

The invention will be more particularly illustrated by the following examples in which all parts are by weight unless otherwise indicated.

Example I 50 parts by weight of 2-amino-3-methoxyacetophenone is dispersed in 100 parts by volume of 28% HCl and the resulting solution cooled to about 0° C. To the cooled solution there is slowly added, with vigorous stirring and cooling, 30 parts by weight of sodium nitrite in about 85 parts by volume of water. After a few minutes the solution is carefully neutralized with sodium carbonate.

Cuprous chloride (prepared from 150 parts by weight of copper sulphate) is suspended in about 200 parts by volume of cool water and a solution of 70 parts by weight of sodium cyanide in 100 parts by volume of water added slowly with stirring. The resulting sodium cuprous cyanide complex is cooled to about 0° C., and to the cooled solution there is added slowly, with vigorous stirring and cooling, the neutralized diazonium solution. The resulting mixture is held at a temperature of about 0° C. for an additional thirty minutes and then warmed slightly to about 50° C., with constant stirring. The mixture is then cooled and the resulting precipitate of 2-cyano-3-methoxyacetophenone removed and purified by recrystallization from benzene.

10 parts by weight of 2-cyano-3-methoxyacetophenone are cooled to about 0° C. and 25 parts by volume of liquid hydrogen cyanide added. There is then added .015 part by volume of 50% aqueous potassium hydroxide and the resulting clear solution allowed to stand for several hours. At the end of this time there is added 0.02 part by volume of concentrated hydrochloric acid, followed by about 50 parts by volume of benzene. Substantially all of the benzene is then removed by distillation under vacuum and a second volume of benzene added and again removed by distillation. The solid residue is primarily 2-cyano-3-methoxyacetophenonecyanohydrin.

5 parts by weight of 2-cyano-3-methoxyacetophenonecyanohydrin is dispersed in about 25 parts by volume of concentrated HCl and this mixture refluxed for about four hours. The resulting solution is cooled and extracted with ethyl acetate. The ethyl acetate solvent is removed by evaporation and the residual solid taken up in acetone and filtered. The acetone solvent is partially removed by distillation with the simultaneous addition of water and the resulting precipitate of 3-methyl-3-carboxy-7-methoxy-phthalide is recovered by filtration.

In place of the 2-amino-3-methoxyacetophenone employed in the above example, other 2-amino-3-alkoxyacetophenones can be employed to produce the corresponding 3-methyl-3-carboxy-7-alkoxyphthalides. For instance, one can employ an equal molar quantity of 2-aminoethoxyacetophenone in place of the 2-amino-3-methoxyacetophenone to produce 3-methyl-3-carboxy-7-ethoxyphthalide. Likewise, an equal molar quantity of 2-amino-3-hydroxyacetophenone can be employed in the procedure of the above example to produce 3-methyl-3-carboxy-7-hydroxyphthalide.

Example II 0.1 part by weight of 3-methyl-3-carboxy-7-methoxyphthalide is dissolved in 20 parts by volume of absolute ethanol containing about 0.2 part by volume of concentrated sulfuric acid. The solution is refluxed two hours and then allowed to stand overnight. The resulting solution is concentrated to about 0.5 part by volume and to this there is added 10 parts by volume of 1 molar phosphate buffer. The resulting solution is extracted with ethyl acetate. Substantially all of the ethyl acetate solvent is then removed from the extract by evaporation in vauco and the resulting reidue is crystallized from alcohol-water to give the crystalline ethyl ester of 3-methyl-3-carboxy-7-methoxyphthalide.

Example III

To 15 parts by volume of methanol containing about 0.1 part by volume of sulfuric acid there is added 0.1 part by weight of 3-methyl-3-carboxy-7-methoxyphthalide and the resulting solution refluxed for about three hours. The solution is then concentrated to about 7 parts by volume and to this there is added 10 parts by volume of 1 molar phosphate buffer and 5 parts by volume of water. The resulting solution is extracted with ethylacetate and the extracted washed with sodium carbonate solution, dried and evaporated in vacuo to an oily residue. Crystallization of this residue from methanol-water gives the crystalline methyl ester of 3-methyl-3-carboxy-7-methoxyphthalide.

We claim:

1. The new compound 3-methyl-3-carboxy-7-methoxyphthalide.
2. The ethyl ester of 3-methyl-3-carboxy-7-methoxyphthalide.
3. The methyl ester of 3-methyl-3-carboxy-7-methoxyphthalide.
4. The new compound 3-methyl-3-carboxy-7-ethoxyphthalide.
5. The new compound 3-methyl-3-carboxy-7-hydroxyphthalide.
6. The method of claim 10 where the mineral acid is 6 to 12 normal hydrochloric acid and the reaction is performed at a temperature of from about 90° C. to 120° C.
7. A method of preparing 3-methyl-3-carboxy-7-methoxyphthalide which comprises hydrolyzing 2-cyano-3-methoxyacetophenonecyanohydrin by heating a quantity of said 2-cyano-3-methoxyacetophenonecyanohydrin at a temperature of from about 90° C. to 120° C., in the presence of an excess of 6 to 12 normal hydrochloric acid.
8. The 3-methyl-3-carboxy-7-(lower alkoxy)phthalides.
9. Compounds selected from the group consisting of carboxylic acids represented by the formula

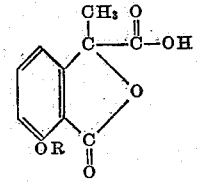

in which R represents a member selected from the group consisting of hydrogen and lower alkyl radicals, metallic salts of said acids, and the lower alkyl and lower aralkyl esters of said acids.

10. A method of preparing compounds selected from the group consisting of carboxylic acids represented by the formula

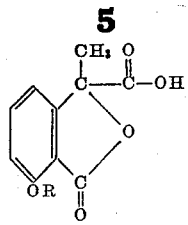

in which R represents a member selected from the group consisting of hydrogen and lower alkyl radicals, metallic salts of said acids, and the lower alkyl and lower aralkyl esters of said acids, which comprises heating at a temperature of from about 40° C. to 125° C. and in the presence of a mineral acid, a compound represented by the formula

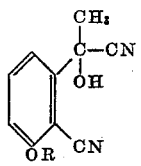

in which R is as defined above, with at least three molar equivalents of water.

References Cited in the file of this patent

Fritsch: "Liebigs Annalen" (1897), vol. 296, p. 354.
Meldrum: "J. Chem. Soc." (London), vol. 99 (1911), pp. 1716–20.
Chem. Abst., vol. 41 (1947), p. 425.
Chem. Abst., vol. 35 (1941), p. 96.